(12) United States Patent
Wasserstrom et al.

(10) Patent No.: US 11,782,726 B1
(45) Date of Patent: Oct. 10, 2023

(54) SERIAL BOOTSTRAP

(71) Applicants: Barak Wasserstrom, Mizpe Aviv (IL); Idan Saar, Tel Aviv (IL); Robert Klein, KfarTavor (IL)

(72) Inventors: Barak Wasserstrom, Mizpe Aviv (IL); Idan Saar, Tel Aviv (IL); Robert Klein, KfarTavor (IL)

(73) Assignee: Amazon Technologies, Inc., Reno, NV (US)

( * ) Notice: Subject to any disclaimer, the term of this patent is extended or adjusted under 35 U.S.C. 154(b) by 333 days.

(21) Appl. No.: 17/036,604

(22) Filed: Sep. 29, 2020

(51) Int. Cl.
*G06F 9/4401* (2018.01)
(52) U.S. Cl.
CPC .................. *G06F 9/4401* (2013.01)
(58) Field of Classification Search
None
See application file for complete search history.

(56) References Cited

U.S. PATENT DOCUMENTS

| | | | | |
|---|---|---|---|---|
| 2003/0093587 | A1* | 5/2003 | Benedix | G06F 9/4411 710/2 |
| 2007/0168652 | A1* | 7/2007 | Mylly | G06F 9/4401 713/2 |
| 2017/0097830 | A1* | 4/2017 | Ehrenberg | G06F 21/602 |
| 2017/0124332 | A1* | 5/2017 | Dover | H04L 9/3247 |
| 2018/0081847 | A1* | 3/2018 | Parthasarathy | G06F 13/4022 |

* cited by examiner

*Primary Examiner* — Paul Yen
(74) *Attorney, Agent, or Firm* — Hogan Lovells US LLP

(57) ABSTRACT

Approaches in accordance with various embodiments can be used to provide bootstrap data for a computing device, such as a system on chip (SoC). In particular, various embodiments can use one or more shift registers to receive bits of a sequence of bootstrap data in parallel. Individual bits of this bootstrap data sequence can then be provided to the SoC, from the shift register(s), serially and using a single input. Such an approach prevents the need for multiple bootstrap pins on the SoC, as well as the need to multiplex those pins for use with other external devices.

20 Claims, 5 Drawing Sheets

SERIAL BOOTSTRAP

BACKGROUND

Many existing computing systems utilize various system on chip (SoC) components, which essentially integrate a computing device or platform into an integrated circuit or similar component. Traditionally, the early behavior of these SoCs is defined using a set of bootstrap pins. These bootstrap pins can be used at reset to control aspects such as phase-locked loop (PLL) frequencies, boot devices, or other aspects or tasks that are to occur before execution of software. These SoC devices may include a significant number of bootstrap pins, such as dozens or more for some devices. Because these bootstrap pins would only be sampled at reset, these pins are often multiplexed with functional pins to avoid wasting precious real estate for dedicated I/O pads. Unfortunately, this multiplexing can cause signal integrity issues, which might result in incorrect bootstrap values or interference to the functional interfaces.

BRIEF DESCRIPTION OF THE DRAWINGS

Various embodiments in accordance with the present disclosure will be described with reference to the drawings, in which.

DETAILED DESCRIPTION

Approaches in accordance with various embodiments can be used to provide data, such as bootstrap data, to a computing device or component, such as a system on chip (SoC). In particular, various embodiments can use one or more shift registers to receive bits of bootstrap data in parallel, which can then be provided to the SoC serially using a single input. Such an approach prevents the need for multiple bootstrap pins on the SoC, as well as the need to multiplex those pins for use with other external devices. Such an approach also avoids issues with signal integrity, timing, electrical, and other potential operational issues.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
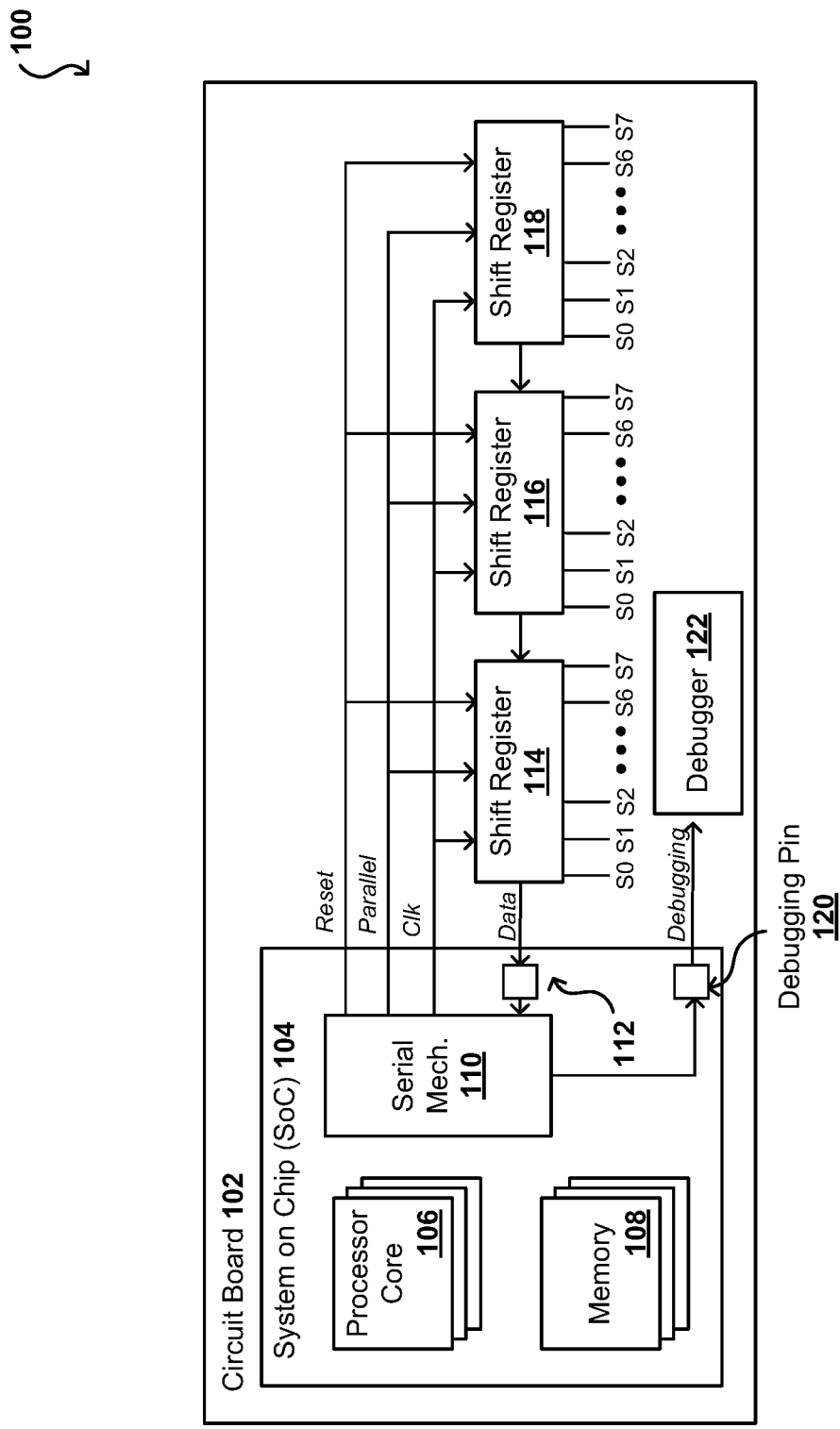
FIG. 1 illustrates components of an example computing system utilizing multiple shift registers that can be utilized in accordance with various embodiments.

FIG. 1 illustrates an example computing device 100 including a system on chip (SoC) component 104 on a circuit board, as may be inserted into a computing device. This SoC may be configured to perform specific tasks on behalf of the computing device, using one or more processors, processor cores 106, or microcontrollers on the SoC, as may include one or more central processing units (CPUs), graphic processing units (GPUs), digital signal processors (DPSs), or cores of those components. The SoC 104 can include one or more types or instances of memory 108 or storage, as may include flash memory. The SoC 104 may also include communication buses and circuitry, as may relate to one or more application-specific integrated circuits that may each be customized for a particular use. The SoC may also have one or more I/O components that allow for data input and output, as well as the providing of control signals, that may come from components on the circuit board 102, a computer into which this board is installed, or an external device. Other system configurations can be used as well within the scope of various embodiments, such as a system on board (SoB) configuration that may have similar interfaces.

As mentioned, the early behavior of such an SoC after reset, or another such action, can be defined using a set of bootstrap pins. In at least one embodiment, these pins can be general purpose I/O pins, or GPIOs. The state of these pins (e.g., high or low) at boot or reset can determine important features of the microcontroller, such as output voltages to one or more components. In order to provide the necessary amount of bootstrap data, an SoC device might include dozens of bootstrap pins. These pins can occupy a significant amount of real estate on the chip. Further, the multiplexing of these pins with functional pins can result in signal integrity issues as discussed previously, as well as timing, electrical, and other potential operational issues. A need to detach devices that are connected to these pins at reset can also add complexity to the design.

Approaches in accordance with various embodiments can attempt to avoid these and other such issues by providing a serial mechanism, or serial data manager, inside the SoC 104 that can be used for sampling bootstrap data. In at least one embodiment, such a mechanism or serial data manager can serially sample as many bootstrap bits as needed, while utilizing only a single physical bootstrap pin 112 instead of a large number of bootstrap pins. This mechanism can work with at least one shift register 114 on the circuit board 102 to obtain this bootstrap data. This shift register 114 can refer to, or comprise, any appropriate component that is able to receive input through one or more inputs in parallel through two or more inputs, then provide that output sequentially, and is not limited to an off-the-shelf shift register. This may include devices such as a parallel-in, serial out (PISO) shift register or a programmable device such as a complex programmable logic device (CPLD). In at least one embodiment, a shift register can be used that includes a cascade of flip flops sharing the same clock, which in this case can be provided by the SoC. The output of each flip flop can be connected to the data input of the next flip flop in the sequence, whereby the circuit can shift the stored bit array by one position at each clock cycle or transition. This results in the bits, here the bootstrap data, being pushed out one at a time, in sequence, at a rate determined by the applied clock signal. In at least one embodiment, a signal from a clock (or, or external to, the SoC) can be used to toggle a strobe output pin at a relatively low frequency (e.g., 1 MHz). The SoC 104, or serial mechanism, can have a single input 112 used to capture the serial input from the shift register 114. With each strobe or clock cycle, the bits of data in the shift register 114 can be shifted by one position (e.g., from right to left in the figure) with the bit that was previously in the S0 position (in the figure) being output as a bit of data to be input to the SoC 104 according to the determined sequence. This can continue until all data in the shift register 114 is transferred to the SoC 104, and after the reset operation is completed the SoC can execute the appropriate software or instructions for its assigned tasks(s). In other embodiments, other components can be used instead of a shift register that can push one bootstrap bit per strobe, as may include one or more microcontrollers. As mentioned, in at least one embodiment these shift register inputs can be based on onboard registers, as per a conventional approach. This bootstrap data can be used to program the SoC (or another such device or component) at reset or startup, where those program instructions can come from one or more external devices. In at least one embodiment, pins can be tied to logic values on the board that indicate how the SoC should program itself, such as via an external ROM or parallel interface, among other such options.

A shift register in general will have a specific number of inputs, such as 8 or 16 separate single bit inputs. As mentioned, however, an SoC may require dozens of bits of bootstrap data at reset, which can exceed the input capacity of a single shift register. Accordingly, a configuration can be utilized as illustrated in FIG. 1, which utilizes a number of shift registers 114, 116, 118 in sequence. A number of shift registers (e.g., 5 or 7) can be selected that provides for the appropriate number of bits of input. These shift registers 114, 116, 118 can work together to effectively provide a single, large shift register that has a desired number of parallel inputs, but can provide single bit, serial output. In this example, a serial mechanism 110 is illustrated as a component of an SoC 104, and can communicate with the shift registers 114, 116, 118 on the circuit board 102 to which the SoC is connected. The serial mechanism can include any appropriate component(s), such as simple logic and circuitry that can toggle the state of a shift register. In other embodiments, however, the serial mechanism could include other components, such as a processor core or microcontroller, memory, clock, and one or more data registers, along with associated circuitry and other components, and can function as a serial data manager that can perform additional data management functions. In this example, the serial mechanism can output a reset signal (or a clock signal for shift registers that may not include a reset pin or input) at reset to cause the shift registers 114, 116, 118 to enter reset mode, wherein the registers will accept bootstrap data and shift that bootstrap data serially to the serial mechanism 110, which can then provide this bootstrap data as appropriate to the components of the SoC. The serial mechanism 110 can provide a clock signal to these registers that can be used to ensure that bit shifting of each of these registers is synchronized per the appropriate clock cycles or transitions. The inputs of these shift registers may come from specific registers on the circuit board 102. There may also be an additional pad or pin 120 that is provided with external access for debugging of this process, such as to ensure that the data is being sampled correctly. This can include passing data directly from the bootstrap pin 112 to the serial debugging pin 120 one bit at a time, pushing the sequence from the serial mechanism, or receiving a request for sequence data (through another input pin in some embodiments) and then providing that data for debugging or verification, among other such options. A debugger 122, which can include a processor and software in at least some embodiments, can verify the sequence to ensure that the SoC receives the proper configuration information. In at least one embodiment, this debugger is on the same circuit board 102, although the debugger could be part of a separate system in at least one embodiment. Once all the bootstrap data has been transferred successfully to the SoC, and any verification has completed successfully, the SoC can begin running the provided configuration.

Figure 2:
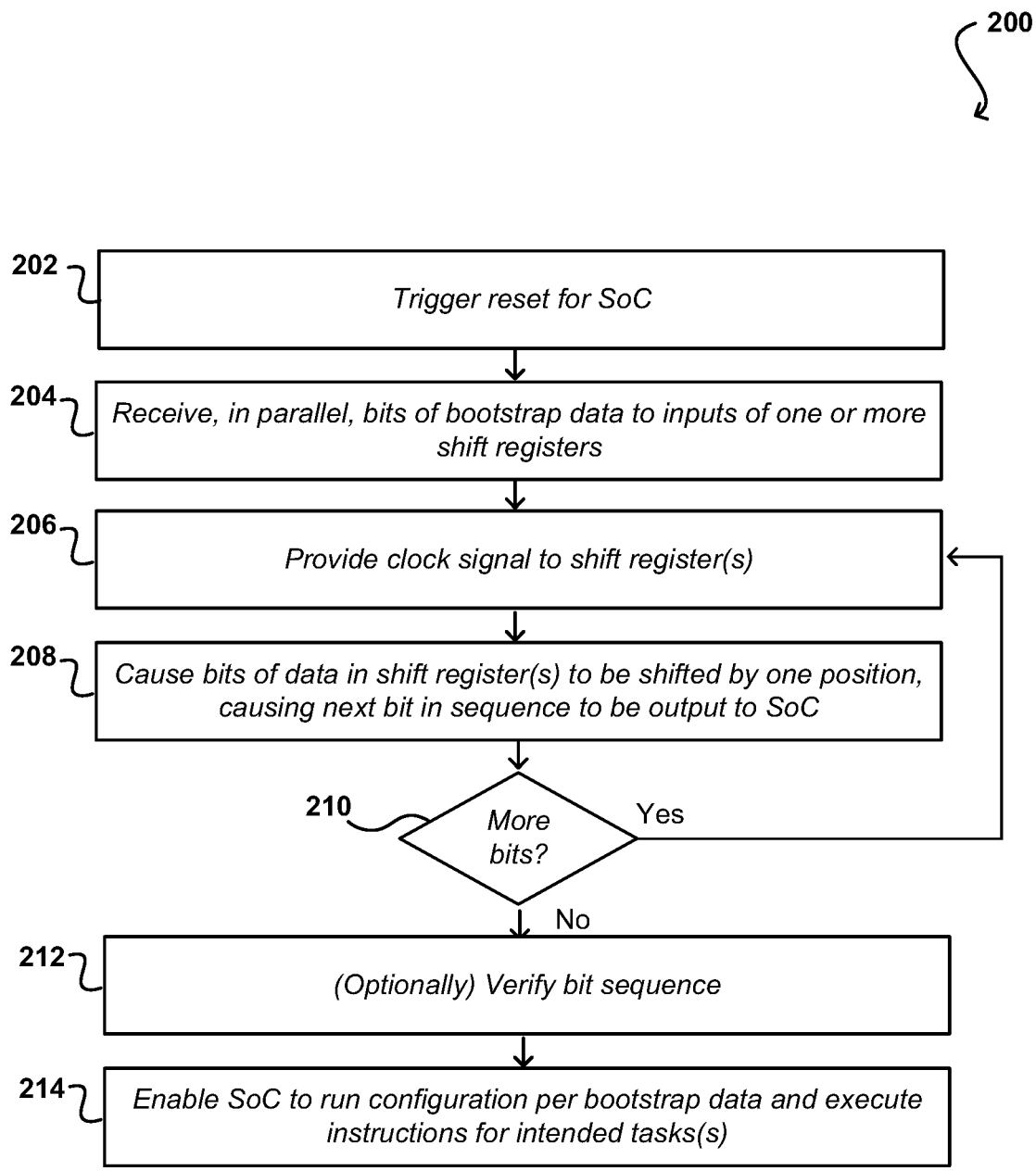
FIG. 2 illustrates an example process for utilizing shift registers with bootstrap data at reset that can be utilized in accordance with various embodiments.

FIG. 2 illustrates an example process 200 for providing bootstrap information at reset that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, while this example is discussed with respect to an SoC device, it should be understood that aspects of various embodiments can be used with other computing and processing devices as well, or for other methods of data transfer. In this example, a reset is triggered 202 for an SoC device. The reset can require bootstrap information to be able to properly configure the SoC for operation. As a result of the reset, bits of bootstrap data can be received 204 in parallel to inputs of one or more shift registers, as may be located on a circuit board connected to the SoC. A clock signal 206 can be provided to the shift registers from a single clock source, where each shift register will receive a given clock transition in parallel. In response to receiving a clock signal or transition, bits of bootstrap data in the shift register(s) can be caused 208 to be shifted by one position in the register(s), with a next bit in a bootstrap sequence being output to the SoC. A determination can be made 210 as to whether there are more bits in the sequence to be provided to the SoC, and if so the process can continue with the next clock cycle. In some embodiments, the amount of data (or number of bits) to be transferred may be stored in a board register, the SoC, a serial mechanism, or another such location. Once all bits of the sequence have been successfully output, serially, from the shift register(s), the bit sequence may be verified 212 in at least some embodiments, such as by using a debugging pin with external access by a microcontroller configured to verify the sequence of bits. If all data has been received to the SoC and any verification is successful then the SoC can be enabled 214 to run the configuration per the bootstrap data, and can execute software or other instructions for its intended task(s).

Figure 3:
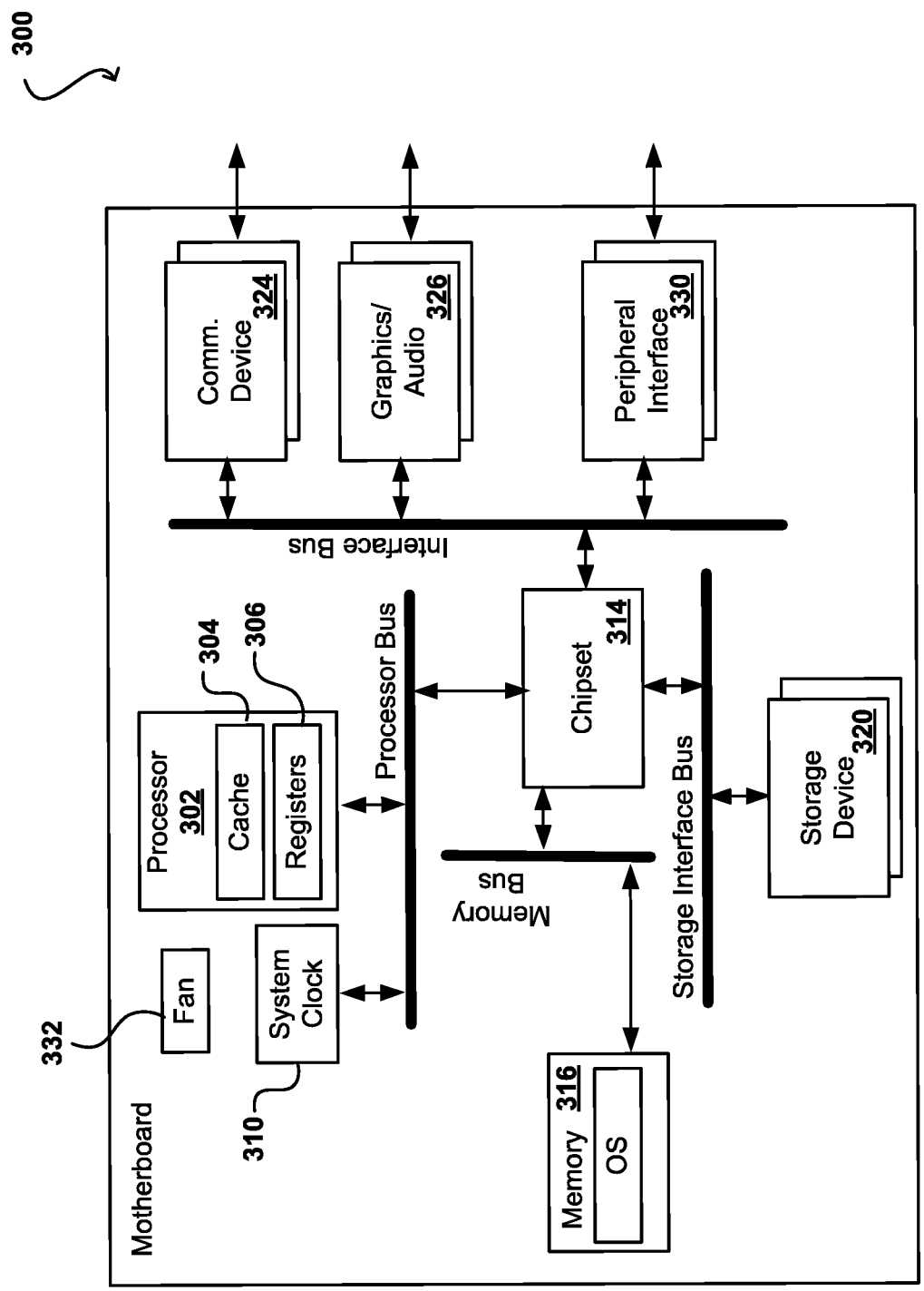
FIG. 3 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 3 illustrates components of an example computing device 300 that can be utilized in accordance with various embodiments. As known for computing devices, the computer will have one or more processors 302, such as central processing units (CPUs), graphics processing units (GPUs), and the like, that are electronically and/or communicatively coupled with various components using various buses, traces, and other such mechanisms. A processor 302 can include memory registers 306 and cache memory 304 for holding instructions, data, and the like. In this example, a chipset 314, which can include a northbridge and southbridge in some embodiments, can work with the various system buses to connect the processor 302 to components such as system memory 316, in the form or physical RAM or ROM, which can include the code for the operating system as well as various other instructions and data utilized for operation of the computing device. The computing device can also contain, or communicate with, one or more storage devices 320, such as hard drives, flash drives, optical storage, and the like, for persisting data and instructions similar, or in addition to, those stored in the processor and memory. The processor 302 can also communicate with various other components via the chipset 314 and an interface bus (or graphics bus, etc.), where those components can include communications devices 324 such as cellular modems or network cards, media components 326, such as graphics cards and audio components, and peripheral interfaces 330 for connecting peripheral devices, such as printers, keyboards, and the like. At least one cooling fan 332 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 302 can obtain data from physical memory 316, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 304 in at least some embodiments. The computing device 300 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 330, a communication device 324, a graphics or audio card 326, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 302 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 4:
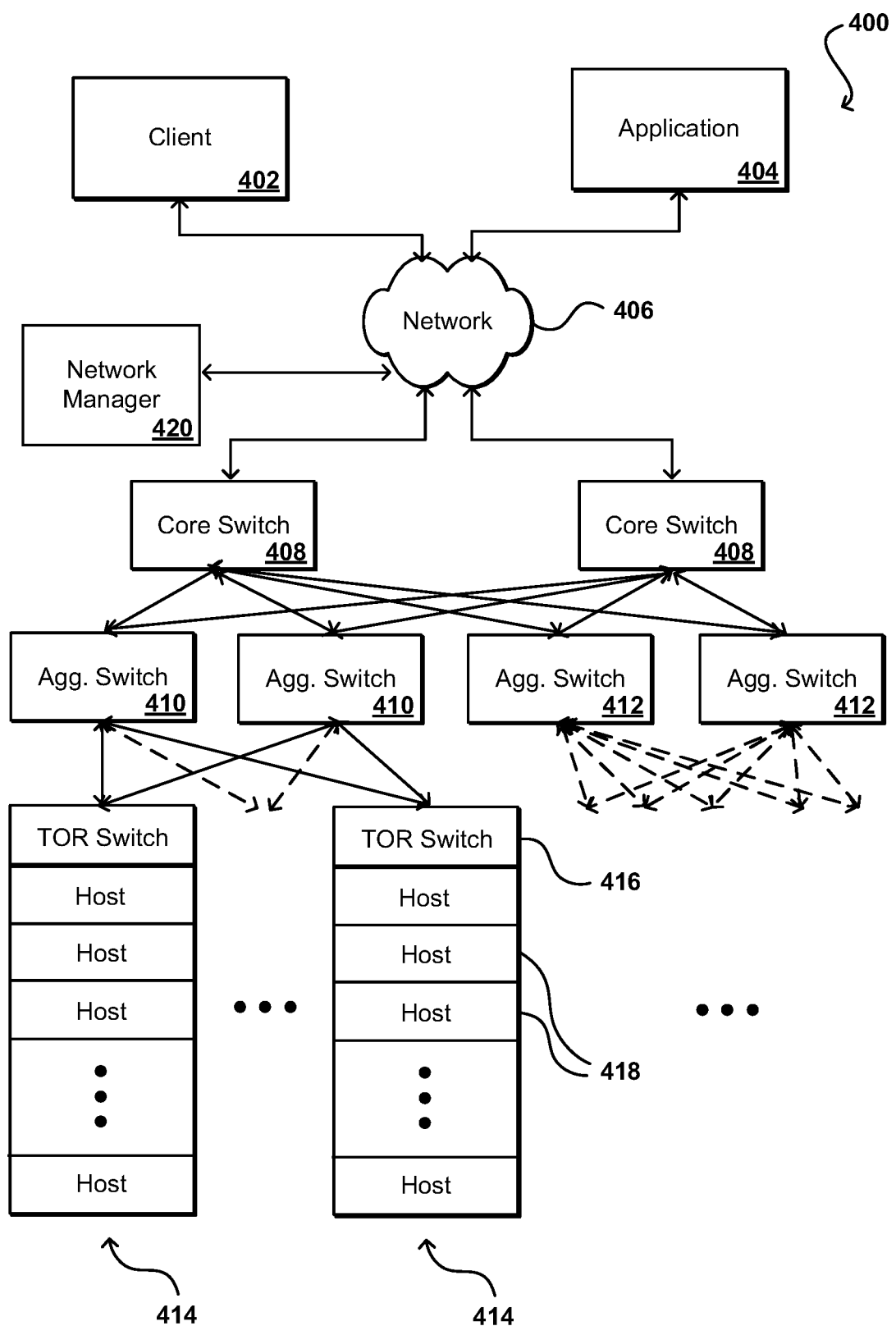
FIG. 4 illustrates components of an example data center environment in which aspects of various embodiments can be implemented.

As mentioned, SoC devices may be utilized in a shared resource environment, such as a data center or server farm. FIG. 4 illustrates an example network configuration 400 that can be used to route communications between specific host machines or other such devices in such an environment. This example shows a typical design that can be used for a data center, wherein a source such as a client device 402 or application 404 is able to send requests across at least one network 406, such as the Internet or a cellular network, to be received by one or more components of the data center. Properties of various components of the network, such as provisioned instances, etc., can be managed using at least one management system, component, or service 420. In this example, the requests are received over the network to one of a plurality of core switches 408, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 408 is able to communicate with each of a plurality of aggregation switches 410, 412, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 410, 412 is linked to a plurality of physical racks 414, each of which typically contains a top of rack (TOR) or "access" switch 416 and a plurality of physical host machines 418, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 406. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 5:
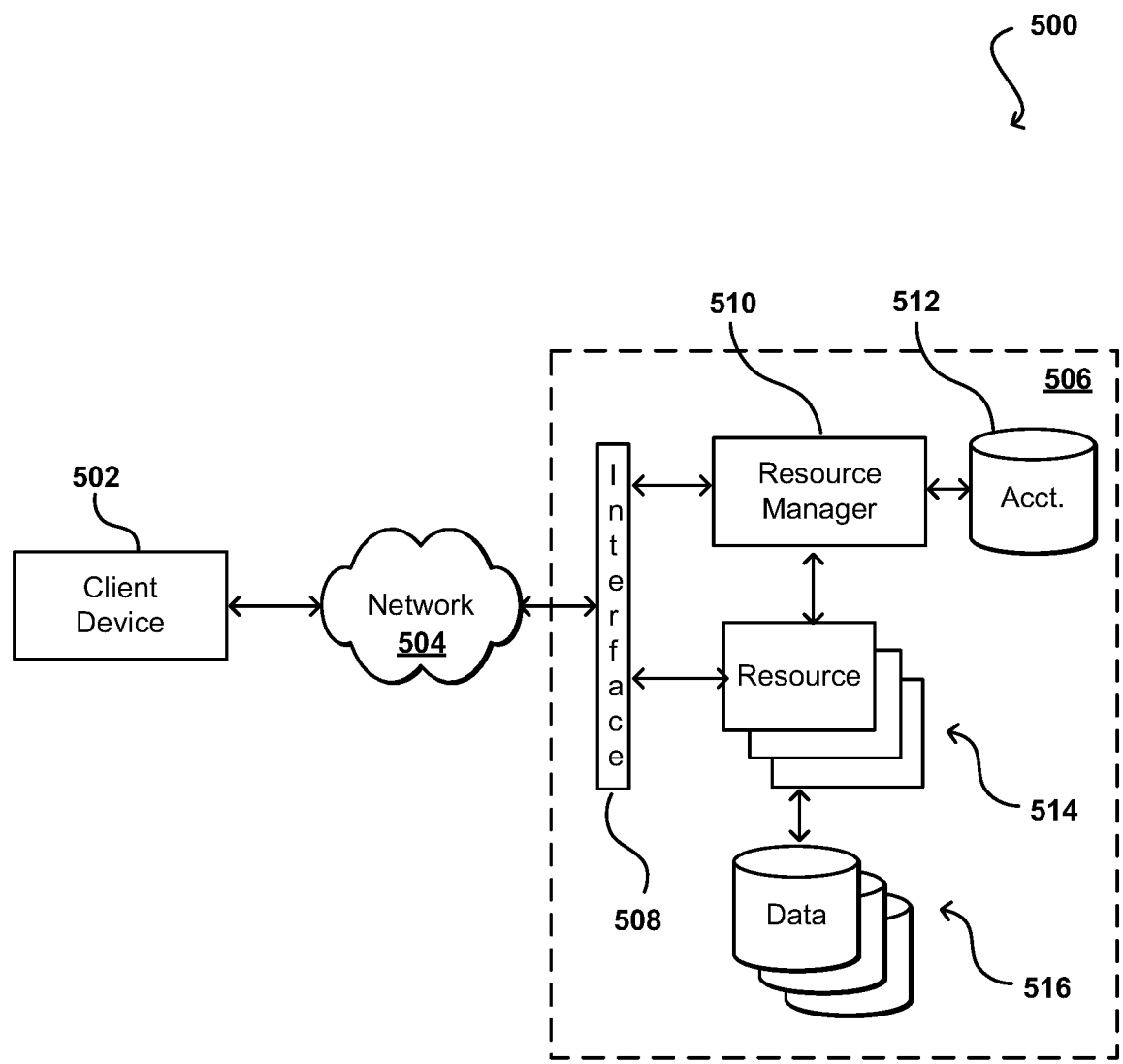
FIG. 5 illustrates components of another example environment in which aspects of various embodiments can be implemented.

As mentioned, such a configuration can be used in some embodiments to provide resource capacity for one or more users or customers as part of a shared resource environment. FIG. 5 illustrates an example of one such environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A computer-implemented method, comprising:
   initiating a reset of a system on chip (SoC) device;
   serializing bootstrap data by a serial mechanism integrated into the SoC device, the serializing comprising:
      sending, by the serial mechanism, a reset signal to a set of shift registers;
      receiving, in parallel, bits of bootstrap data to at the set of shift registers;
      providing, by the serial mechanism, a clock signal in parallel to the set of shift registers;
      causing, at individual clock cycles of the clock signal, the bits to be shifted by one position in the shift registers;
   providing the individual bits of the bootstrap data serially as input to only a single bootstrap pin of the serial mechanism according to a sequence of the bootstrap data; and
   causing, after the bits of bootstrap data are received to the serial mechanism, the SoC device to operate using a configuration determined using the bootstrap data.

2. The computer-implemented method of claim 1, further comprising:
   verifying the sequence of the bootstrap data output by the set of shift registers before causing the SoC device to operate using the configuration determined using the bootstrap data.

3. The computer-implemented method of claim 1, wherein the shift registers and the SoC device are connected to a circuit board of a computing system.

4. The computer-implemented method of claim 1, wherein the bits of the bootstrap data are received to the serial mechanism of the SoC device containing logic to obtain the bootstrap data from the set of shift registers.

5. The computer-implemented method of claim 1, wherein the bits of bootstrap data are sampled from one or more external data sources.

6. A system, comprising:
   a shift register configured to receive bits of bootstrap data in parallel;
   a single bootstrap pin for receiving the bootstrap data at a system on chip (SoC) device; and
   a serial data mechanism integrated into the SoC device, the serial data mechanism configured to receive, from the shift register, bits of the bootstrap data serially in a bootstrap sequence and provide the bits in the bootstrap sequence as configuration data for the SoC device at the single bootstrap pin.

7. The system of claim 6, wherein the system on chip (SoC) device contains at least one processor core, wherein the SoC device obtains the configuration data during a reset mode.

8. The system of claim 6, wherein the SoC device and the shift register are connected to a circuit board of a computing system, and wherein the bits of the bootstrap data are received from one or more sources on the circuit board.

9. The system of claim 6, wherein the shift register is one of a plurality of shift registers configured to receive respective portions of the bootstrap sequence in parallel and provide the bits of the bootstrap sequence serially to the serial data mechanism.

10. The system of claim 9, wherein a clock signal is provided in parallel to the plurality of shift registers in order to synchronize shifting of bits between the shift registers.

11. The system of claim 10, wherein the bits are caused, at individual clock cycles of the clock signal, to be shifted by one position in the shift registers, wherein individual bits of the bootstrap data are caused to be provided serially according to the bootstrap sequence.

12. The system of claim 10, wherein the bootstrap sequence output by the shift registers is verified before being utilized as configuration data.

13. The system of claim 6, wherein the serial data mechanism provides a signal to the shift register before the bits of bootstrap data are able to be received.

14. The system of claim 6, wherein the bits of bootstrap data are able to be sampled from one or more external data sources.

15. A system, comprising:
   a system on chip (SoC) device;
   a plurality of shift registers; and
   a serial mechanism integrated into the SoC device including logic to cause the plurality of shift registers to receive a sequence of bootstrap data in parallel, and to cause the plurality of shift registers to provide the sequence of bootstrap data as input to a single bootstrap pin of the serial mechanism serially according to the sequence.

16. The system of claim 15, wherein a clock signal is provided in parallel to the plurality of shift registers in order to synchronize shifting of the bootstrap data between the plurality of shift registers.

17. The system of claim 15, wherein the bits are caused, at individual clock cycles of the clock signal, to be shifted by one position in the shift registers, wherein individual bits of the bootstrap data are caused to be output from the shift registers serially according to the sequence.

18. The system of claim 15, wherein the serial mechanism includes logic for obtaining verification of the sequence of the bootstrap data output by the set of shift registers before causing the SoC device to operate using configuration determined using the bootstrap data.

19. The system of claim 15, wherein the serial mechanism provides a signal to the shift registers before the bits of bootstrap data are able to be received at the shift registers.

20. The system of claim 15, wherein the SoC device, the shift registers, and the serial mechanism are connected to a circuit board of a computing system, and wherein the bits of the bootstrap data are received from one or more sources on the circuit board.

* * * * *